H. H. Fultz,

Horse Power.

Nº 13,167.

Patented July 3, 1855.

UNITED STATES PATENT OFFICE.

H. H. FULTZ, OF LEXINGTON, MISSISSIPPI.

HORSE-POWER.

Specification of Letters Patent No. 13,167, dated July 3, 1855.

*To all whom it may concern:*

Be it known that I, H. H. FULTZ, of Lexington, in the county of Holmes and State of Mississippi, have invented a new and Improved Horse-Power; and I do hereby declare that the following is a full, clear, and exact description of the same, reference being had to the annexed drawings, making a part of this specification, in which—

Figure 1:
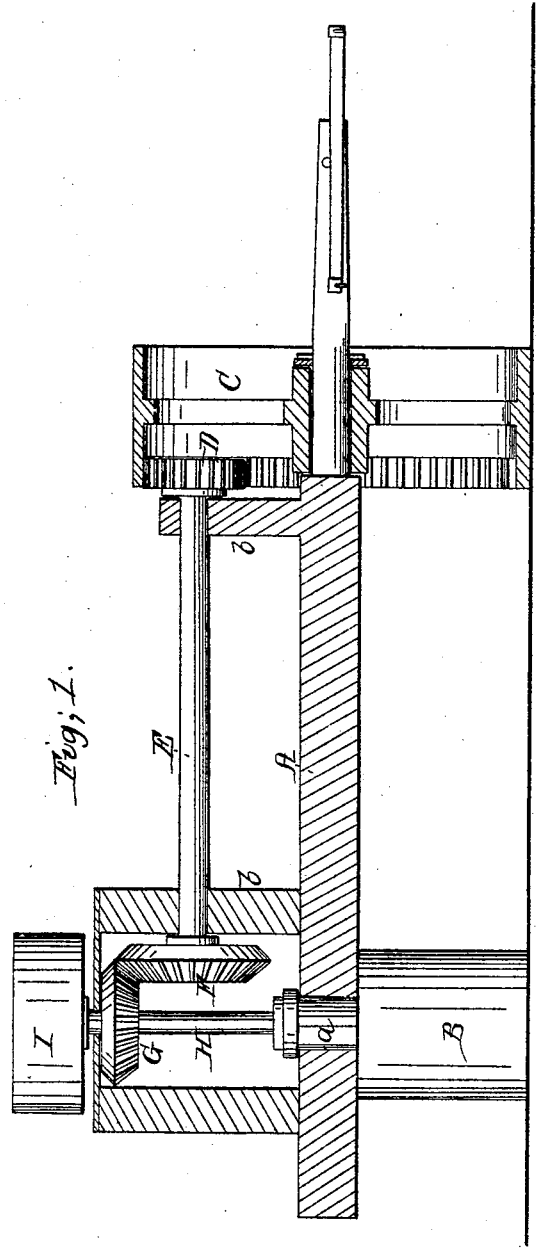
Figure 2:
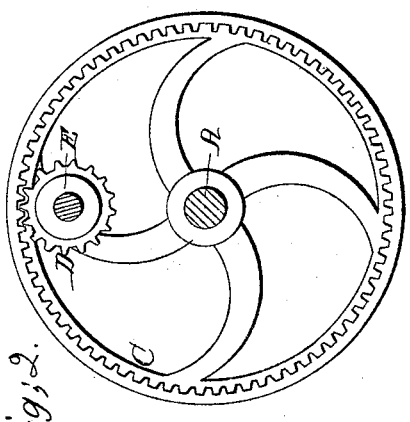

Figure 1, is a longitudinal vertical section of my improvement. Fig. 2, is an inner face view of the driving wheel or ditto.

Similar letters of reference indicate corresponding parts in the two figures.

The nature of my invention consists in the application of a driving wheel in combination with a shaft and pinion, constructed and arranged in a peculiar way as will be presently shown and described.

To enable others skilled in the art to fully understand and construct my invention, I will proceed to describe it.

A, represents a bar or shaft the inner end of which works or turns freely on a pivot or journal (*a*) at the upper end of a support B, see Fig. 1. On the outer end of the bar or shaft A, a wheel C, is placed, said wheel turning freely on the bar or shaft and resting or bearing upon the surface of the ground or a suitable level platform. The periphery of the wheel C, may be smooth or it may be provided with transverse projections to prevent it slipping. A smooth surface however will answer in most cases.

The inner periphery of the driving wheel is cogged on the inner edge and a pinion D, gears therein; said pinion being hung on the outer end of a shaft E, which works in suitable bearings in uprights (*b*), (*b*), attached to the bar or shaft A. The inner end of the bar or shaft A, has a bevel wheel F, hung upon it, and this bevel wheel gears into a corresponding wheel G, which is placed on a vertical shaft H. The lower end of the shaft H, is stepped on the upper part of the pivot or journal (*a*) and a drum or pulley I, is placed on the upper end of the shaft H, the power being taken from said pulley.

The team is attached to the outer end of the bar or shaft A, and as the driving wheel C, rotates, the shaft H, pinion D, and bevel gear F, G, communicate motion to the shaft A.

The above invention is extremely simple and economical to manufacture. A one horse power machine can be constructed in Mississippi for $40, which is far less than the cheapest machines in present use. I have one constructed which works admirably well, driving a cotton gin of 50 saws. Any mechanic of ordinary ability can construct one, the gearing where castings cannot be readily obtained may be of wood and any blacksmith can make the small amount of iron work required, such as the bearings for the shafts and the shafts also, which may be formed of iron bars either square or round.

Having thus described my invention, what I claim as new and desire to secure by Letters Patent, is—

The application of the driving wheel C, in combination with the shaft A, and pinion D, when constructed and operating in the manner described, for the purpose specified.

H. H. FULTZ.

Witnesses:
 Jos. Geo. Mason,
 Wm. Tusch.